(12) United States Patent
Kawamata et al.

(10) Patent No.: US 11,298,780 B2
(45) Date of Patent: Apr. 12, 2022

(54) FLUX AND SOLDER PASTE USING THE SAME

(71) Applicant: Senju Metal Industry Co., Ltd., Tokyo (JP)

(72) Inventors: Hiroaki Kawamata, Chiba (JP); Hayato Kaise, Tokyo (JP); Syuta Akatsuka, Tokyo (JP); Kengo Ohta, Kanagawa (JP); Sakie Okada, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 17/213,763

(22) Filed: Mar. 26, 2021

(65) Prior Publication Data
US 2021/0299799 A1    Sep. 30, 2021

(30) Foreign Application Priority Data
Mar. 27, 2020 (JP) .............................. JP2020-058266

(51) Int. Cl.
*B23K 35/02*   (2006.01)
*B23K 35/362*  (2006.01)
*B23K 103/08*  (2006.01)
*B23K 103/00*  (2006.01)

(52) U.S. Cl.
CPC .......... *B23K 35/362* (2013.01); *B23K 35/025* (2013.01); *B23K 2103/08* (2018.08); *B23K 2103/42* (2018.08); *B23K 2103/54* (2018.08)

(58) Field of Classification Search
None
See application file for complete search history.

(56) References Cited

U.S. PATENT DOCUMENTS

| | | | | |
|---|---|---|---|---|
| 5,064,482 A | * | 11/1991 | Goobich | B23K 35/36 |
| | | | | 148/24 |
| 5,443,660 A | * | 8/1995 | Gao | B23K 35/3612 |
| | | | | 148/23 |
| 6,887,319 B2 | * | 5/2005 | Suga | B23K 35/3612 |
| | | | | 148/23 |
| 9,566,668 B2 | * | 2/2017 | Pujari | B23K 35/025 |

(Continued)

FOREIGN PATENT DOCUMENTS

| | | |
|---|---|---|
| CN | 1569383 A | 1/2005 |
| CN | 106514057 A | 3/2017 |

(Continued)

*Primary Examiner* — Devang R Patel
(74) *Attorney, Agent, or Firm* — The Webb Law Firm

(57) ABSTRACT

Provided is flux containing rosin-based resin, a solvent, a thixotropic agent and an activator. The thixotropic agent includes any or both of hardened castor oil and bisamide-based thixotropic agent. The contents of the hardened castor oil and the bisamide-based thixotropic agent are respectively within the range of 4 wt. % or more and 10 wt. % or less and the range of 1 wt. % or more and 5 wt. % or less based on the total weight of the flux. The contents of the thixotropic agent are within the range of 5 wt. % or more and 15 wt. % or less based on the total weight of the flux. The activator includes hydrohalide, a halogenated aliphatic compound and an imidazole compound. The contents of the halogen in the flux are within the range of 9000 ppm or more and 50000 ppm or less.

6 Claims, 2 Drawing Sheets

(56) References Cited

U.S. PATENT DOCUMENTS

| | | | |
|---|---|---|---|
| 9,770,786 B2* | 9/2017 | Toyoda | H05K 3/3463 |
| 10,259,083 B2 | 4/2019 | Kojima et al. | |
| 2013/0333807 A1* | 12/2013 | Okada | B23K 35/262 |
| | | | 148/25 |
| 2017/0304961 A1* | 10/2017 | Takagi | F16B 5/08 |
| 2019/0015937 A1* | 1/2019 | Nakaji | B23K 35/362 |
| 2021/0069837 A1 | 3/2021 | Kajikawa et al. | |
| 2021/0078113 A1 | 3/2021 | Kawanago et al. | |

FOREIGN PATENT DOCUMENTS

| | | |
|---|---|---|
| CN | 109262161 A | 1/2019 |
| JP | 2010137283 A | 6/2010 |
| TW | 201938310 A | 10/2019 |
| TW | 201945330 A | 12/2019 |
| WO | 2015037107 A1 | 3/2015 |

* cited by examiner ive been incorporated by reference in its entirety.

FLUX AND SOLDER PASTE USING THE SAME

CROSS REFERENCE TO RELATED APPLICATION

This application claims priority to Japanese Patent Application No. 2020-058266 filed Mar. 27, 2020, the disclosure of which is hereby incorporated by reference in its entirety.

BACKGROUND

(1) Field

The present invention relates to flux and solder paste using the same, particularly easy-to-clean, water-soluble flux used for soldering and easy-to-clean, water-soluble solder paste.

(2) Description of Related Art

The flux used for the soldering generally has effects of chemically removing metal oxides present on solder and a metal surface of a joint target to be soldered and allowing movement of metal elements at the boundary between them. Therefore, by soldering using the flux, an intermetallic compound can be formed between the solder and the metal surface of the joint target, so that strong joint can be obtained.

The solder paste is a composite material obtained by adding solder alloy powder to the flux. In the soldering using the solder paste, the soldering is performed so that the solder paste is printed on a portion to be soldered such as electrodes on a substrate, any components are mounted on the portion to be soldered on which the solder paste has been printed, and the substrate is heated in a heating furnace called for a "reflow furnace" to melt the solder.

In a high-density assembly, a solder bridge is easy to occur by hot slump of the solder paste. Therefore, the hot slump of the solder paste has been restrained in the past to prevent the solder bridge.

Japanese Patent Application Publications No. 2010-137283 discloses the flux and the solder paste which can prevent the solder from slumping in heating even if contents of halogen compounds are reduced.

In a case of an ultra-high-density assembly such as 0201 chip assembly, the solder paste has been printed so that the printed area of the solder paste is narrower than an area of a land as a countermeasure against the displacement on a printed position of the solder paste.

SUMMARY

In a case where the solder paste has been printed so that the printed area of the solder paste is narrower than the area of the land, however, the solder has not been spread up to the entire land because of using fine solder alloy powder that is susceptible to oxidation.

In the ultra-high-density assembly, if the solder paste has been printed so that the printed area of the solder paste is narrower than the area of the land and the solder is not spread up to the entire land, any soldering failure may occur.

The present invention addresses such issue, and an object thereof is to provide flux and solder paste using the flux, by which the flux or the solder paste using the same is intentionally configured to be easy to the hot slump and is spread to the entire land if the solder paste has been printed so that the printed area of the solder paste is narrower than the area of the land, which allows the solder to be spread on the entire land.

To address the issues and achieve other advantages in accordance with the object of the illustrated embodiments, in one aspect, described is flux containing rosin-based resin, a solvent, a thixotropic agent and an activator. The thixotropic agent includes any or both of hardened castor oil and bisamide-based thixotropic agent. The contents of the hardened castor oil are within the range of 4 wt. % or more and 10 wt. % or less based on the total weight of the flux and the contents of the bisamide-based thixotropic agent are within the range of 1 wt. % or more and 5 wt. % or less based on the total weight of the flux. The contents of the thixotropic agent are within the range of 5 wt. % or more and 15 wt. % or less based on the total weight of the flux. The activator includes hydrohalide, a halogenated aliphatic compound and an imidazole compound and the contents of the halogen in the flux are within the range of 9000 ppm or more and 50000 ppm or less. Of the patterns shown in FIG. 6 in the hot slump test of JISZ3284-3 established in 2014, a minimum interval between the patterns in which all the printed fluxes are not united after heating of 90 degrees C./3 min is evaluated to 1.2 mm or more.

The contents of the hydrohalide may be within the range of 1 wt. % or more and 3 wt. % or less based on the total weight of the flux. The contents of the halogenated aliphatic compound may be within the range of 1 wt. % or more and 5 wt. % or less based on the total weight of the flux. The contents of the imidazole compound may be within the range of 1 wt. % or more and 5 wt. % or less based on the total weight of the flux.

To address the issues and achieve other advantages in accordance with the object of the illustrated embodiments, in another aspect, described is solder paste containing the above flux and solder alloy powder.

DETAILED DESCRIPTION

Figure 1:
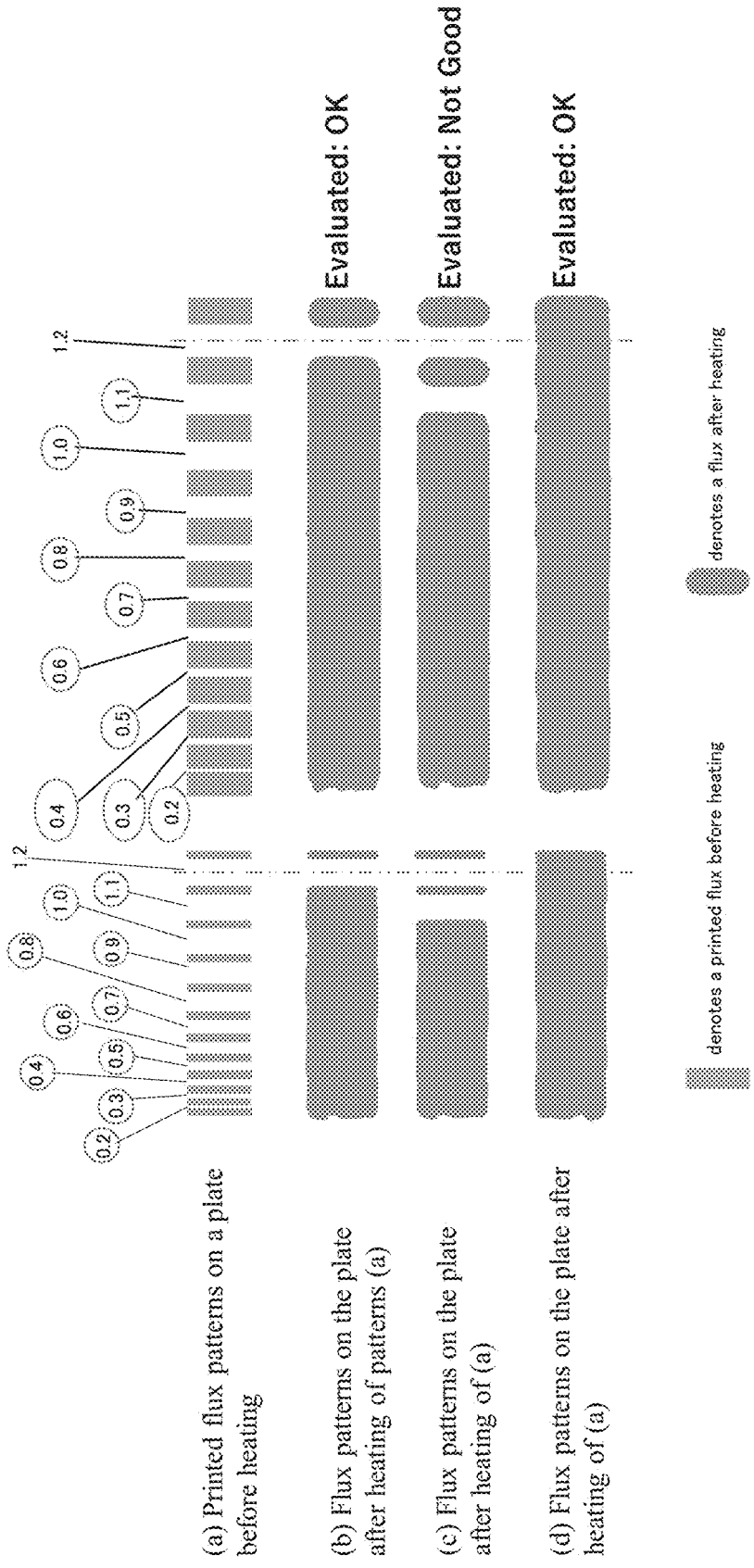
FIG. 1 shows an evaluation of the minimum interval between the patterns in which all the printed fluxes are not united after heating of 90 degrees C./3 min that is evaluated to 1.2 mm or more (good patterns in rows (b) and (d) after heating printed flux patterns in row (a), and not-good patterns in row (c) after heating the printed flux patterns in row (a)).
Figure 2:
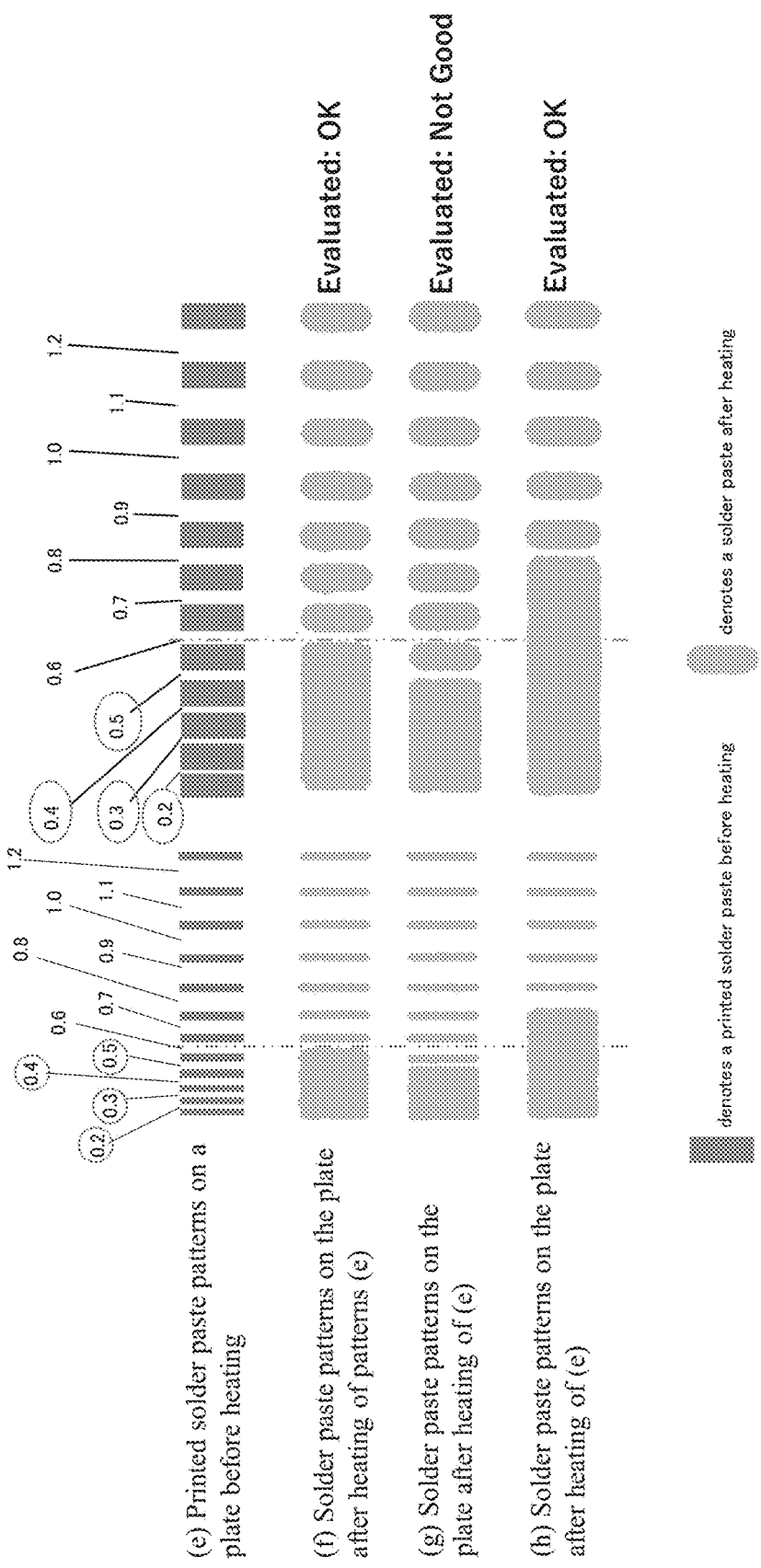
FIG. 2 shows an evaluation of the minimum interval between the patterns in which all the printed solder pastes are not united after heating of 150 degrees C./10 min that is evaluated to 0.6 mm or more (good patterns in rows (f) and (h) after heating printed solder paste patterns in row (e), and not-good patterns in row (g) after heating the printed solder paste patterns in row (e)).

Other objects and attainments of the present invention will be become apparent to those skill in the art upon a reading of the following detailed description.

The illustrated embodiments are not limited in any way to what is illustrated as the illustrated embodiments described below, and they are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skill in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinally skill in the art to which the invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an" and "the" include plural referents unless the context clearly dictates otherwise.

<Example of Easy-to-clean, Water-soluble Flux according to each of the Embodiments>

Easy-to-clean, water-soluble flux in each of these embodiments contains rosin-based resin, a solvent, a thixotropic agent and an activator. The thixotropic agent includes any or both of hardened castor oil and bisamide-based thixotropic agent. The contents of the hardened castor oil are within the range of 4 wt. % or more and 10 wt. % or less based on the total weight of the flux and the contents of the bisamide-based thixotropic agent are within the range of 1 wt. % or more and 5 wt. % or less based on the total weight of the flux. The contents of the thixotropic agent are within the range of 5 wt. % or more and 15 wt. % or less based on the total weight of the flux. The activator includes hydrohalide, a halogenated aliphatic compound and an imidazole compound and the contents of the halogen in the flux are within the range of 9000 ppm or more and 50000 ppm or less. Of the patterns shown in FIG. 6 in the hot slump test of JISZ3284-3 established in 2014, a minimum interval between the patterns in which all the printed fluxes are not united after heating of 90 degrees C./3 min is evaluated to 1.2 mm or more.

Accordingly, by using the flux and the solder paste including the flux and the solder alloy powder, even when the solder paste is printed so that the printed area of the solder paste is narrower than the area of the land, the solder spreads over the entire land. The flux or solder paste also enables any residues to be made clean.

As the rosin, for example, exemplified are natural rosins such as gum rosin, wood rosin, and tall oil rosin, and derivatives obtained from the natural rosin. As the derivatives, for example, exemplified are purified rosins, hydrogenated rosins, disproportionated rosins, polymerized rosins, acid modified rosins (for example, acrylic acid modified hydrogenated rosin), phenol modified rosins, a, (3 unsaturated carboxylic acid modified products (acrylated rosins, maleated rosins, fumarated rosins, and the like), the purified products, hydrides, and disproportionated products of the polymerized rosins, the purified products, hydrides, and disproportionated products of the α,β-unsaturated carboxylic acid modified products and the like.

As the solvent, exemplified are alcohol-based solvent, glycol ether-based solvent, terpinols and the like. As the alcohol-based solvent, exemplified are isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2, 3-dimethyl-2, 3-butanediol, 2-methylpentane-2,4-diol, 1,1,1-Tris(hydroxymethyl)propane, 2-ethyl-2-hydroxymethyl-1,3-propanediol, 2,2'-(Oxybismethylene)bis(2-ethyl-1,3-propanediol), 2,2-Bis(hydroxymethyl)-1,3-propanediol, 1,2,6-trihydroxyhexane, 1-Ethynyl-1-cyclohexanol, 1,4-Cyclohexanediol, 1,4-Cyclohexanedimethanol, 2,4,7,9-Tetramethyl-5-decyne-4,7-diol and the like. As the glycol ether-based solvent, exemplified are diethylene glycol mono-2-ethylhexyl ether, ethylene glycol monophenyl ether, diethylene glycol monohexyl ether, diethylene glycol dibutyl ether, triethylene glycol monobutyl ether, methyl propylene triglycol, tripropyleneglycol mono butyl ether, triethylene glycol butyl methyl ether, tetraethylene glycol dimethyl ether and the like.

As the thixotropic agent, exemplified are a wax-based thixotropic agent and an amide-based thixotropic agent. As the wax-based thixotropic agent, for example, hardened castor oil is exemplified. As the amide-based thixotropic agent, exemplified are lauric acid amide, palmitic acid amide, stearic acid amide, behenic acid amide, hydroxystearic acid amide, saturated fatty acid amide, oleic acid amide, erucic acid amide, unsaturated fatty acid amide, p-toluenmethane amide, aromatic amide, methylenebis stearic acid amide, ethylenebis lauric acid amide, ethylenebis hydroxystearic acid amide, saturated fatty acid bisamide, methylenebis oleic acid amide, unsaturated fatty acid bisamide, m-xylylenebis stearic acid amide, aromatic bisamide, substituted amide, methylol stearic acid amide, methylol amide, fatty acid ester amide and the like. The contents of the thixotropic agent may be preferably within the range of 5 wt. % or more and 15 wt. % or less when the total amount of the flux is estimated at 100. The thixotropic agent preferably includes the hardened castor oil within the range of 4 wt. % or more and 10 wt. % or less and the bisamide-based thixotropic agent within the range of 1 wt. % or more and 5 wt. % or less.

As the activator, exemplified are hydrohalide, a halogenated aliphatic compound, organic acid, an imidazole compound and the like. The halogenated aliphatic compound is a compound having a halogenated aliphatic hydrocarbon group. The aliphatic hydrocarbon group may be a saturated aliphatic hydrocarbon group or an unsaturated aliphatic hydrocarbon group. As the halogenated aliphatic compound, exemplified are halogenated aliphatic alcohol and a halogenated heterocyclic compound.

The halogenated heterocyclic compound is represented by a following general formula (1):

$$R_1\text{-}(R_2)n \ldots \quad (1)$$

wherein $R_1$ represents a heterocyclic group with n-valent, and $R_2$ represents a halogenated aliphatic hydrocarbon group.

As the organic acid, exemplified are adipic acid, azelaic acid, eicosane diacid, citric acid, glycolic acid, succinic acid, salicylic acid, dipicolinic acid, dibutyl aniline diglycolic acid, suberic acid, sebacic acid, thioglycol acid, terephthalic acid, dodecanedioic acid, parahydroxyphenylacetic acid, picolinic acid, phenylsuccinic acid, phtharic acid, fumaric acid, maleic acid, malonic acid, lauric acid, benzoic acid, tartaric acid, glycine, 1,3-cyclohexanedicarboxylic acid, 2,2-bis(hydroxymethyl)butanoic acid, 2,3-dihydroxybenzoic acid, 2,4-diethyl glutaric acid, 2-quinolinecarboxylic acid, 3-hydroxybenzoic acid, malic acid, p-anisic acid, stearic acid, 12-hydroxystearic acid, oleic acid, linoleic acid, linolenic acid and the like.

As the halogenated aliphatic compound, exemplified are 1-Bromo-2-propanol, 3-Bromo-1-propanol, 3-Bromo-1,2-propanediol, 1-Bromo-2-butanol, 1,3-Dibromo-2-propanol, 2,3-Dibromo-1-propanol, 1,4-Dibromo-2-butanol, 2,3-Dibromo-1,4-butandiol, trans-2,3-Dibromo-2-butene-1,4-diol, tris(2,3-dibromopropyl)isocyanurate and the like. The contents of the halogenated aliphatic compound may be preferably within the range of 1 wt. % or more and 5 wt. % or less when the total amount of the flux is estimated at 100.

As amine, exemplified are ethylamine, triethylamine, ethylenediamine, triethylenetetramine and the like. As imidazole which is an example of amine of the heterocyclic compound or an imidazole compound such as imidazole derivatives, exemplified are 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo [1,2-a]benzimidazole, 1-dodecyl-2-methyl-3-benzylimidazolium chloride, 2-methylimidazoline, 2-phenylimidazoline, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole and the like. The contents of the imidazole compound may be preferably within the range of 1 wt. % or more and 5 wt. % or less when the total amount of the flux is estimated at 100.

As the heterocyclic compound such as azoles other than the imidazole compound, exemplified are 2,4-diamino-6-vinyl-s-triazine, 2,4-diamino-6-vinyl-s-triazine isocyanuric acid adduct, 2,4-diamino-6-methacryloylethyl-s-trazine, 2-(2'-Hydroxy-5'-methylphenyl)benzotriazole, 2-(2'-Hydroxy-3'-tert-butyl-5'-methylphenyl)-5-chlorobenzotriazole, 2-(2'-Hydroxy-3',5'-di-tert-amylphenyl)benzotriazole, 2-(2'-Hydroxy-5'-tert-octylphenyl)benzotriazole, 2,2'-Methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-Benzotriazole, 1-[N,N-bis(2-ethylhexyl)aminomethyl]benzotriazole, Carboxybenzotriazole, 1-[N,N-bis(2-ethylhexyl) aminomethyl]methylbenzotriazole, 2, 2'-[[(Methyl-1H-benzotriazol-1-yl) methyl] imino] bisethanol, 1-(1',2'-Dicarboxyethyl) benzotriazole, 1-(2,3-Dicarboxypropyl) benzotriazole, 1-[(2-ethylhexylamino) methyl] benzotriazole, 2,6-Bis [(1H-benzotriazole-1-yl) methyl]-4-methylphenol, 5-methylbenzotriazole, 5-Phenyltetrazole, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct dihydrate and the like.

The amine hydrohalide is a compound formed by reacting amine and hydrogen halide. As the amine thereof, exemplified are ethylamine, diethylamine, triethylamine, ethylenediamine,1,3-Diphenylguanidine, 1,3-Di-o-tolylguanidine, 1-(o-Tolyl)biguanide and the like. As the hydrogen halide, exemplified is a hydride of chlorine, bromine or iodine. The contents of the amine hydrohalide are preferably within the range of 1 wt. % or more and 3 wt. % or less when the total amount of the flux is estimated at 100.

The easy-to-clean, water-soluble flux according to each of the embodiments may contain any antioxidant in order to prevent the solder alloy powder from being oxidized. As the antioxidant, used is a hindered phenol-based antioxidant such as 2,2'-Methylenebis[6-(1-methylcyclohexyl)-p-cresol].

The easy-to-clean, water-soluble flux according to each of the embodiments may also contain any additive agents such as matting agent and/or anti-foaming agent.

<Example of Easy-to-Clean, Water-soluble Solder Paste according to each of the Embodiments>

The solder paste according to each of the embodiments contains any of the above-mentioned easy-to-clean, water-soluble flux and solder alloy powder. It is preferable that the solder alloy powder is configured to be formed by a solder alloy which does not contain Pb. The solder alloy powder is configured to be formed by Sn, Sn—Ag based alloy, Sn—Cu based alloy, Sn—Ag—Cu based alloy, Sn—Bi based alloy, Sn—In based alloy or the like, or an alloy in which Sb, Bi, In, Cu, Zn, As, Ag, Cd, Fe, Ni, Co, Au, Ge, P or the like is added to any of these alloys.

<Effects of Easy-to-Clean, Water-soluble Flux and Easy-to-Clean, Water-soluble Solder Paste according to each of the Embodiments>

The easy-to-clean, water-soluble flux according to each of the embodiments contains the rosin-based resin, the solvent, the thixotropic agent and the activator. The thixotropic agent includes any or both of hardened castor oil and bisamide-based thixotropic agent. The contents of the hardened castor oil are within the range of 4 wt. % or more and 10 wt. % or less based on the total weight of the flux and the contents of the bisamide-based thixotropic agent are within the range of 1 wt. % or more and 5 wt. % or less based on the total weight of the flux. The contents of the thixotropic agent are within the range of 5 wt. % or more and 15 wt. % or less based on the total weight of the flux. The activator includes the hydrohalide, the halogenated aliphatic compound and the imidazole compound. The contents of the halogen in the flux are within the range of 9000 ppm or more and 50000 ppm or less. Of the patterns shown in FIG. 6 in the hot slump test of JISZ3284-3 established in 2014, a minimum interval between the patterns in which all the printed fluxes are not united after heating of 90 degrees C./3 min is evaluated to 1.2 mm or more. The above flux and the easy-to-clean, water-soluble solder paste including the above flux and the solder alloy powder are intentionally configured to be easy to the hot slump and are spread to the entire land if the solder paste has been printed so that the printed area of the solder paste is narrower than the area of the land.

EXECUTED EXAMPLES

The easy-to-clean, water-soluble flux of each of the Executed Examples and the Comparative Examples was prepared with each of the compositions shown in the following Tables 1 through 3 and the hot slump properties of the flux were verified. The easy-to-clean, water-soluble flux of each of the Executed Examples and the Comparative Examples was prepared with each of the compositions shown in the following Tables 1 through 3 and each of the easy-to-clean, water-soluble solder pastes was also prepared by using each of the fluxes. The solder spread properties, hot slump properties and slump-in-printing properties of each of the solder pastes were then verified. The composition rates in each Table have been expressed in wt. % when the total amount of the flux is estimated at 100.

The solder alloy powder in each of the solder pastes was the powder of Sn—Ag—Cu based solder alloy including Ag in an amount of 3.0 wt. %, Cu in an amount of 0.5 wt. %, and the reminder of Sn. A diameter of the solder alloy powder was 10 μm or less. Each easy-to-clean, water-soluble solder paste contained the easy-to-clean, water-soluble flux in an amount of 12 wt. % and the solder alloy powder in an amount of 88 wt. %.

<Evaluation Result of Solder Spread Properties>

(1) Verification Method

Each of the easy-to-clean, water-soluble solder pastes was printed on a Ni—Au plated glass epoxy board with printed thickness within the range of 10 μm or more and 30 μm or less in a print range of 80 μm in diameter. Solder spread properties were converted into numerical values after a heating treatment such that the board was heated from room temperature to 170 degrees C. at rising rate of 2-3 degrees C./sec; the board was kept at 170 degrees C. for 90 through 120 seconds; and then, the board was heated from 170 degrees C. to 250 degrees C. at rising rate of 2-3 degrees C./sec and was kept at 220 degrees C. or more for 40 through 60 seconds.

(2) Criterion for Determination

Solder spread area of the solder was measured when a printed area of each of the easy-to-clean, water-soluble solder pastes was estimated at 100. Solder spread properties were determined based on the following criterion for the determination.

◯: The solder spread area of the solder was 120 or more.

×: The solder spread area of the solder was less than 120.

<Evaluation Result of Hot Slump Properties>

(1) Verification Method

The hot slump test was performed as follows: using a stainless metal mask in which a printing part having predetermined patterns shown in FIG. 6 of JISZ3284-3 established in 2014 was formed, the patterns were printed by the solder pastes on a copper plate; after removing the metal mask, the copper plate was heated at 150 degrees C./10 min; and the hot slump properties of each of the solder pastes were converted into numerical value. Alternatively, using a stainless metal mask in which a printing part having predetermined patterns shown in FIG. 6 of JISZ3284-3 established in 2014 was formed, the patterns were printed by the fluxes on a copper plate; after removing the metal mask, the copper plate was heated at 90 degrees C./3 min and the hot slump properties of each of the fluxes were converted into numerical value. Thickness of the metal mask was 0.2 mm and the printing part was configured to be two groups of four rows of rectangular apertures, each aperture having a dimension of 3.0 mm in length and 0.7 mm in width or 3.0 mm in length and 1.5 mm in width. The printing part was so configured on the row that the rectangular apertures having the same dimension were arranged in parallel with each other with different intervals on a transverse direction. The intervals L between the apertures on each row were as follows: 0.2 mm, 0.3 mm, 0.4 mm, 0.5 mm, 0.6 mm, 0.7 mm, 0.8 mm, 0.9 mm, 1.0 mm, 1.1 mm and 1.2 mm.

(2) Criterion for Determination

The fluxes and the solder pastes were printed on the copper plate through the apertures of the printing part with the above predetermined intervals using the metal mask. The hot slump properties of the fluxes and the solder pastes were determined by the minimum interval L1 on the four rows between the printed flux or the printed solder paste in which any of the fluxes or the solder pastes were not united after heating and the printed flux or the printed solder paste in which the fluxes or the solder pastes were united after heating.

(a) Determination Result of Hot Slump Properties of Solder Paste

◯: The result of the hot slump test was 0.6 mm or more.

×: The result of the hot slump test was 0.5 mm or less.

(b) Determination Result of Hot Slump Properties of Flux

◯: The result of the hot slump test was 1.2 mm or more.

×: The result of the hot slump test was 1.1 mm or less.

<Evaluation Result of Slump-in-printing Properties>

The slump-in-printing test was performed as follows: using a stainless metal mask in which a printing part having predetermined patterns was formed in conformity to JISZ3284-3, 4.3 established in 2014, the patterns were printed by the solder pastes on a copper plate; after removing the metal mask, the copper plate was kept at room temperature such as 25±5 degrees C. and in relative humidity of 50±10% for 10 through 20 minutes; and the slump-in-printing properties of each of the solder pastes were measured by visual observation of the minimum interval on the four rows between the printed solder pastes in which all the printed solder pastes were not united and the printed solder pastes in which all the printed solder pastes were united, in the printed patterns. Thickness of the metal mask was 0.2 mm and the printing part was configured to be two groups of four rows of rectangular apertures, each aperture having a dimension of 3.0 mm in length and 0.7 mm in width or 3.0 mm in length and 1.5 mm in width. The printing part was so configured on the row that the rectangular apertures having the same dimension were arranged in parallel with each other with different intervals. The intervals L between the apertures on each row were as follows: 0.2 mm, 0.3 mm, 0.4 mm, 0.5 mm, 0.6 mm, 0.7 mm, 0.8 mm, 0.9 mm, 1.0 mm, 1.1 mm and 1.2 mm.

(2) Criterion for Determination

◯: After printing, the minimum interval between the printed solder pastes in which all the printed solder pastes were not united was 0.5 mm or less.

×: After printing, the minimum interval between the printed solder pastes in which all the printed solder pastes were not united was 0.6 mm or more.

TABLE 1

| | | EXECUTED EXAMPLE 1 | EXECUTED EXAMPLE 2 | EXECUTED EXAMPLE 3 | EXECUTED EXAMPLE 4 | EXECUTED EXAMPLE 5 | EXECUTED EXAMPLE 6 | EXECUTED EXAMPLE 7 | EXECUTED EXAMPLE 8 | EXECUTED EXAMPLE 9 |
|---|---|---|---|---|---|---|---|---|---|---|
| ROSINS | Acrylic acid modified hydrogenated rosins | 12 | 12 | 12 | 12 | 12 | 12 | 12 | 12 | 12 |
| | polymerized rosins | 25.5 | 25.5 | 25.5 | 25.5 | 25.5 | 25.5 | 25.5 | 25.5 | 25.5 |
| AMINE HYDRO-HALIDE | Diphenyl-guanidine · HBr salt | 1 | 1 | 3 | | | 3 | 1 | 3 | 1 |
| | diethylamine · HBr salt | | | | 1 | 3 | | | | |

TABLE 1-continued

| | | EXECUTED EXAMPLE 1 | EXECUTED EXAMPLE 2 | EXECUTED EXAMPLE 3 | EXECUTED EXAMPLE 4 | EXECUTED EXAMPLE 5 | EXECUTED EXAMPLE 6 | EXECUTED EXAMPLE 7 | EXECUTED EXAMPLE 8 | EXECUTED EXAMPLE 9 |
|---|---|---|---|---|---|---|---|---|---|---|
| HALOGENATED ALIPHATIC COMPOUNDS | trans-2,3-Dibromo-2-butene-1,4-diol | 1 | 1 | 1 | 1 | 1 | 5 | 5 | | |
| | tris(2,3-dibromopropyl) isocyanurate | | | | | | | | 5 | 5 |
| ORGANIC ACIDS | sebacic acid | 1 | | 1 | 1 | 1 | 1 | 1 | 1 | 1 |
| IMIDAZOLE COMPOUNDS | 2-phenyl-4-methylimidazole | 1 | 1 | 1 | 1 | 1 | 1 | 1 | 1 | 1 |
| | 2-phenylimidazole | | | | | | | | | |
| THIXOTROPIC AGENTS | ethylenebis hydroxystearic acid amide | 1 | 1 | 1 | 5 | 1 | 1 | 1 | 1 | 1 |
| | hardened caster oil polyamide | 9 | 9 | 9 | 10 | 9 | 9 | 9 | 9 | 9 |
| SOLVENTS | ethylene glycol monehexyl ether | 48.5 | 49.5 | 46.5 | 43.5 | 46.5 | 42.5 | 44.5 | 42.5 | 44.5 |
| HALOGEN CONTENTS (ppm) | | 9258 | 9258 | 14778 | 11686 | 22062 | 40770 | 35250 | 41180 | 35560 |
| TOTAL | | 100 | 100 | 100 | 100 | 100 | 100 | 100 | 100 | 100 |
| HOT SLUMP (FLUX) | | ○ | ○ | ○ | ○ | ○ | ○ | ○ | ○ | ○ |
| HOT SLUMP (SOLDER PASTE) | | ○ | ○ | ○ | ○ | ○ | ○ | ○ | ○ | ○ |
| SPREAD PROPERTIES | | ○ | ○ | ○ | ○ | ○ | ○ | ○ | ○ | ○ |
| SLUMP-IN-PRINTING | | ○ | ○ | ○ | ○ | ○ | ○ | ○ | ○ | ○ |

TABLE 2

| | | EXECUTED EXAMPLE 10 | EXECUTED EXAMPLE 11 | EXECUTED EXAMPLE 12 | EXECUTED EXAMPLE 13 | EXECUTED EXAMPLE 14 |
|---|---|---|---|---|---|---|
| ROSINS | Acrylic acid modified hydrogenated rosins | 12 | 12 | 12 | 12 | 12 |
| | polymerized rosins | 25.5 | 25.5 | 25.5 | 25.5 | 25.5 |
| AMINE HYDROHALIDE | Diphenylguanidine · HBr salt | 1 | 3 | 3 | 1 | 1 |
| | diethylamine · HBr salt | | | | | |
| HALOGENATED ALIPHATIC COMPOUNDS | trans-2,3-Dibromo-2-butene-1,4-diol | 1 | 1 | 5 | 5 | 1 |
| | tris(2,3-dibromopropyl) isocyanurate | | | | | |
| ORGANIC ACIDS | sebacic acid | 1 | 1 | 1 | 1 | 1 |
| IMIDAZOLE COMPOUNDS | 2-phenyl-4-methylimidazole | 3 | 3 | 3 | 3 | |
| | 2-phenylimidazole | | | | | 3 |
| THIXOTROPIC AGENTS | ethylenebis hydroxy-stearic acid amide | 1 | 1 | 1 | 1 | 1 |
| | hardened caster oil polyamide | 9 | 9 | 9 | 9 | 9 |
| SOLVENTS | ethylene glycol monehexyl ether | 45.5 | 44.5 | 40.5 | 42.5 | 46.5 |
| HALOGEN CONTENTS (ppm) | | 9258 | 14778 | 40770 | 35260 | 9256 |
| TOTAL | | 100 | 100 | 100 | 100 | 100 |
| HOT SLUMP (FLUX) | | ○ | ○ | ○ | ○ | ○ |
| HOT SLUMP (SOLDER PASTE) | | ○ | ○ | ○ | ○ | ○ |
| SPREAD PROPERTIES | | ○ | ○ | ○ | ○ | ○ |
| SLUMP-IN-PRINTING | | ○ | ○ | ○ | ○ | ○ |

TABLE 2-continued

|  |  | EXECUTED EXAMPLE 15 | EXECUTED EXAMPLE 16 | EXECUTED EXAMPLE 17 | EXECUTED EXAMPLE 18 |
|---|---|---|---|---|---|
| ROSINS | Acrylic acid modified hydrogenated rosins | 12 | 12 | 12 | 12 |
|  | polymerized rosins | 25.5 | 25.5 | 25.5 | 25.5 |
| AMINE HYDROHALIDE | Diphenylguanidine · HBr salt | 1 | 3 | 3 | 1 |
|  | diethylamine · HBr salt |  |  |  |  |
| HALOGENATED ALIPHATIC COMPOUNDS | trans-2,3-Dibromo-2-butene-1,4-diol | 1 | 1 | 5 | 5 |
|  | tris(2,3-dibromopropyl)isocyanurate |  |  |  |  |
| ORGANIC ACIDS | sebacic acid | 1 | 1 | 1 | 1 |
| IMIDAZOLE COMPOUNDS | 2-phenyl-4-methylimidazole | 5 | 5 | 5 | 5 |
|  | 2-phenylimidazole |  |  |  |  |
| THIXOTROPIC AGENTS | ethylenebis hydroxystearic acid amide | 1 | 1 | 1 | 1 |
|  | hardened caster oil polyamide | 9 | 9 | 4 | 9 |
| SOLVENTS | ethylene glycol monehexyl ether | 44.5 | 42.5 | 43.5 | 40.5 |
| HALOGEN CONTENTS (ppm) |  | 9256 | 14775 | 40770 | 35250 |
| TOTAL |  | 100 | 100 | 100 | 100 |
| HOT SLUMP (FLUX) |  | ○ | ○ | ○ | ○ |
| HOT SLUMP (SOLDER PASTE) |  | ○ | ○ | ○ | ○ |
| SPREAD PROPERTIES |  | ○ | ○ | ○ | ○ |
| SLUMP-IN-PRINTING |  | ○ | ○ | ○ | ○ |

TABLE 3

|  |  | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|
| ROSINS | Acrylic acid modified hydrogenated rosins | 12 | 12 | 12 | 12 |
|  | polymerized rosins | 25.5 | 25.5 | 25.5 | 25.5 |
| AMINE HYDROHALIDE | Diphenylguanidine · HBr salt | 0.5 | 0 | 1 | 0.5 |
|  | diethylamine · HBr salt |  |  |  |  |
| HALOGENATED ALIPHATIC COMPOUNDS | trans-2,3-Dibromo-2-butene-1,4-diol | 0.5 | 1 | 0 | 0.5 |
|  | tris(2,3-dibromopropyl)isocyanurate |  |  |  |  |
| ORGANIC ACIDS | sebacic acid | 1 | 1 | 1 | 1 |
| IMIDAZOLE COMPOUNDS | 2-phenyl-4-methylimidazole | 0.5 | 1 | 1 | 0 |
|  | 2-phenylimidazole |  |  |  |  |
| THIXOTROPIC AGENTS | ethylenebis hydroxy-stearic acid amide | 1 | 1 | 1 | 1 |
|  | hardened caster oil polyamide | 9 | 9 | 9 | 9 |
| SOLVENTS | ethylene glycol monohexyl ether | 50 | 49.5 | 49.5 | 50.5 |
| HALOGEN CONTENTS (ppm) |  | 4629 | 6498 | 2760 | 4629 |
| TOTAL |  | 100 | 100 | 100 | 100 |
| HOT SLUMP (FLUX) |  | ○ | ○ | ○ | ○ |
| HOT SLUMP (SOLDER PASTE) |  | ○ | ○ | ○ | ○ |
| SPREAD PROPERTIES |  | x | x | x | x |
| SLUMP-IN-PRINTING |  | ○ | ○ | ○ | ○ |

|  |  | COMPARATIVE EXAMPLE 5 | COMPARATIVE EXAMPLE 6 | COMPARATIVE EXAMPLE 7 |
|---|---|---|---|---|
| ROSINS | Acrylic acid modified hydrogenated rosins | 12 | 12 | 12 |
|  | polymerized rosins | 25.5 | 25.5 | 25.5 |
| AMINE HYDROHALIDE | Diphenylguanidine · HBr salt | 1 | 1 | 1 |
|  | diethylamine · HBr salt |  |  |  |
| HALOGENATED ALIPHATIC COMPOUNDS | trans-2,3-Dibromo-2-butene-1,4-diol | 1 | 1 | 1 |
|  | tris(2,3-dibromopropyl)isocyanurate |  |  |  |
| ORGANIC ACIDS | sebacic acid | 1 | 1 | 1 |
| IMIDAZOLE COMPOUNDS | 2-phenyl-4-methylimidazole | 1 | 1 | 1 |
|  | 2-phenylimidazole |  |  |  |
| THIXOTROPIC AGENTS | ethylenebis hydroxystearic acid amide | 1 | 6 | 1 |
|  | hardened caster oil polyamide | 3 | 10 |  |

TABLE 3-continued

| SOLVENTS ethylene glycol monehexyl ether | 54.5 | 42.5 | 51.5 |
|---|---|---|---|
| HALOGEN CONTENTS (ppm) | 9258 | 9258 | 9258 |
| TOTAL | 100 | 100 | 100 |
| HOT SLUMP (FLUX) | ○ | x | x |
| HOT SLUMP (SOLDER PASTE) | ○ | x | x |
| SPREAD PROPERTIES | ○ | x | x |
| SLUMP-IN-PRINTING | x | ○ | ○ |

The flux of each of the Executed Examples 1 through 18 contained the rosin-based resin, the solvent, the thixotropic agent and the activator in the range limited by the present invention. The thixotropic agent includes any or both of hardened castor oil and bisamide-based thixotropic agent in the range limited by the present invention. The activator included the hydrohalide, the halogenated aliphatic compound and the imidazole compound in the range limited by the present invention. The contents of the halogen in the flux were within the range of 9000 ppm or more and 50000 ppm or less, and of the patterns shown in FIG. 6 in the hot slump test of JISZ3284-3 established in 2014, a minimum interval between the patterns in which all the printed fluxes were not united after heating of 90 degrees C./3 min was evaluated to 1.2 mm or more. This allows the fluxes to be intentionally slumped by heating, thereby obtaining sufficient effects to the hot slump properties.

Regarding each of the solder pastes in the Executed Examples 1 through 18, by slumping the flux intentionally by heating, the thickness of the easy-to-clean, water-soluble solder paste printed on a Ni—Au plated glass epoxy board was within the range of 10 μm or more and 30 μm or less. When a printed area of the easy-to-clean, water-soluble solder paste was estimated at 100 in a print range of 80 μm in diameter, a solder spread area of each of the solder pastes was 120 or more after the board was heated from room temperature to 170 degrees C. at rising rate of 2-3 degrees C./sec and was kept at 170 degrees C. for 90 through 120 seconds and then, the board was heated from 170 degrees C. to 250 degrees C. at rising rate of 2-3 degrees C./sec and was kept at 220 degrees C. or more for 40 through 60 seconds. Of the patterns shown in FIG. 6 in the hot slump test of JISZ3284-3 established in 2014, a minimum interval between the patterns in which all the printed solder pastes were not united after heating of 150 degrees C./10 min was evaluated to 0.6 mm or more. This allows the solder pastes to be easily slumped in the heating, thereby obtaining sufficient solder spread effects. The solder pastes also obtain sufficient effects to the slump-in-printing properties.

On the other hand, the flux of the Comparative Example 1 contained the hydrohalide, the halogenated aliphatic compound and the imidazole compound in the range which was less than a low limit of the present invention and the contents of the halogen in the flux were less than 9000 ppm. The solder paste of the Comparative Example 1 does not obtain any sufficient solder spread effects.

The flux of the Comparative Example 2 contained the halogenated aliphatic compound in the range limited by the present invention but did not contain the hydrohalide, and the contents of the halogen in the flux were less than 9000 ppm. The solder paste of the Comparative Example 2 does not obtain any sufficient solder spread effects.

The flux of the Comparative Example 3 contained the hydrohalide in the range limited by the present invention but did not contain the halogenated aliphatic compound, and the contents of the halogen in the flux were less than 9000 ppm. The solder paste of the Comparative Example 3 does not obtain any sufficient solder spread effects.

The flux of the Comparative Example 4 contained the hydrohalide and the halogenated aliphatic compound in the range which was less than a low limit of the present invention and did not contain the imidazole compound, and the contents of the halogen in the flux were less than 9000 ppm. The solder paste of the Comparative Example 4 does not obtain any sufficient solder spread effects.

In the flux of the Comparative Example 5, the contents of the halogen in the flux were within the range limited by the present invention but the contents of the thixotropic agent were less than a low limit of the present invention. The solder paste of the Comparative Example 5 do not obtain any sufficient effects to the slump-in-printing properties.

In the flux of the Comparative Example 6, the contents of the halogen in the flux were within the range limited by the present invention but the contents of the thixotropic agent exceeded an upper limit of the present invention. The flux and solder paste of the Comparative Example 6 do not obtain any sufficient effects to the hot slump properties. The solder paste of the Comparative Example 6 does not obtain any sufficient solder spread effects.

In the flux of the Comparative Example 7, the contents of the halogen in the flux were within the range limited by the present invention. The hardened castor oil, however, was not contained as the thixotropic agent but the polyamide was contained as the thixotropic agent. The flux and solder paste of the Comparative Example 7 do not obtain any sufficient effects to the hot slump properties. The solder paste of the Comparative Example 7 does not obtain any sufficient solder spread effects.

From the above, it is understood that the easy-to-clean, water-soluble flux of each of the Executed Examples allows the hot slump to be prevented. It is also understood that the easy-to-clean, water-soluble solder paste of each of the Executed Examples allows the hot slump to be prevented.

It is to be noted that any technical scope of the claims and/or meaning of term(s) claimed in the claims are not limited to the description in the above-mentioned embodiments. It should be understood by those skilled in the art that various modifications, combinations, sub-combinations and alternations may occur depending on design requirements and other factors insofar as they are within the scope of the appended claims or the equivalents thereof.

What is claimed is:
1. Flux comprising:
rosin-based resin;
a solvent;
a thixotropic agent; and
an activator,
wherein the thixotropic agent includes both of hardened castor oil and bisamide-based thixotropic agent,
wherein the contents of the hardened castor oil are within the range of 4 wt. % or more and 10 wt. % or less based on the total weight of the flux and the contents of the bisamide-based thixotropic agent are within the range of 1 wt. % or more and 5 wt. % or less based on the total weight of the flux, wherein the contents of the thixotropic agent are within the range of 5 wt. % or more and 15 wt. % or less based on the total weight of the flux, wherein the activator includes hydrohalide, a halogenated aliphatic compound, and an imidazole compound, and the contents of a halogen in the flux are within the range of 9000 ppm or more and 50000 ppm or less, and wherein the flux exhibits hot slump properties according to the patterns shown in FIG. 6 in the hot slump test of JISZ3284-3 established in 2014, such that a minimum interval between the patterns not united after heating of 90 degrees C./3 min is evaluated to 1.2 mm or more.

2. The flux according to claim 1, wherein the contents of the hydrohalide are within the range of 1 wt. % or more and 3 wt. % or less based on the total weight of the flux, wherein the contents of the halogenated aliphatic compound are within the range of 1 wt. % or more and 5 wt. % or less based on the total weight of the flux, and wherein the contents of the imidazole compound are within the range of 1 wt. % or more and 5 wt. % or less based on the total weight of the flux.

3. Solder paste comprising:
the flux according to claim 1; and
solder alloy powder.

4. Solder paste comprising:
the flux according to claim 2; and
solder alloy powder.

5. The solder paste according to claim 3 wherein a thickness of the solder paste printed on a Ni—Au plated glass epoxy board is within the range of 10 μm or more and 30 μm or less, and wherein when a printed area of the solder paste is estimated at 100 in a print range of 80 μm in diameter, a spread area of solder is 120 or more when the board is heated from room temperature to 170 degrees C. at rising rate of 2-3 degrees C./sec and is kept at 170 degrees C. for 90 through 120 seconds and then, the board is heated from 170 degrees C. to 250 degrees C. at rising rate of 2-3 degrees C./sec and is kept at 220 degrees C. or more for 40 through 60 seconds, wherein the solder paste exhibits hot slump properties according to the patterns shown in FIG. 6 in the hot slump test of JISZ3284-3 established in 2014, such that a minimum interval between the patterns not united after heating of 150 degrees C./10 min is evaluated to 0.6 mm or more.

6. The solder paste according to claim 4 wherein a thickness of the solder paste printed on a Ni—Au plated glass epoxy board is within the range of 10 μm or more and 30 μm or less, and wherein when a printed area of the solder paste is estimated at 100 in a print range of 80 μm in diameter, a spread area of solder is 120 or more when the board is heated from room temperature to 170 degrees C. at rising rate of 2-3 degrees C./sec and is kept at 170 degrees C. for 90 through 120 seconds and then, the board is heated from 170 degrees C. to 250 degrees C. at rising rate of 2-3 degrees C./sec and is kept at 220 degrees C. or more for 40 through 60 seconds, wherein the solder paste exhibits hot slump properties according to the patterns shown in FIG. 6 in the hot slump test of JISZ3284-3 established in 2014, such that a minimum interval between the patterns not united after heating of 150 degrees C./10 min is evaluated to 0.6 mm or more.

* * * * *